United States Patent [19]
Mutter

[11] Patent Number: 5,570,729
[45] Date of Patent: Nov. 5, 1996

[54] METHOD AND APPARATUS FOR THE RAPID TANKING OF A PRESSURE CONTAINER WITH A GASEOUS MEDIUM

[75] Inventor: Heinz Mutter, Winterthur, Switzerland

[73] Assignee: Maschinenfabrik Sulzer-Burckhardt AG, Basel, Switzerland

[21] Appl. No.: 330,778

[22] Filed: Oct. 28, 1994

[30] Foreign Application Priority Data

Nov. 8, 1993 [CH] Switzerland ............ 03350/93

[51] Int. Cl.[6] ............................................. F17C 7/00
[52] U.S. Cl. ........................... 141/18; 141/2; 141/4; 141/11; 141/83; 141/197
[58] Field of Search ................... 141/2, 4, 11, 18, 141/21, 83, 95, 197; 73/861.351–861.357

[56] References Cited

U.S. PATENT DOCUMENTS

| | | | |
|---|---|---|---|
| 4,527,600 | 7/1985 | Fisher et al. | 141/4 |
| 4,646,940 | 3/1987 | Kramer et al. | 141/197 X |
| 4,657,055 | 4/1987 | Poulsen | 141/83 |
| 4,813,461 | 3/1989 | Fanshawe et al. | 141/4 |
| 4,911,006 | 3/1990 | Hargarten et al. | 73/861.356 |
| 4,934,196 | 6/1990 | Romano | 73/861.356 |
| 4,966,206 | 10/1990 | Baumann et al. | 141/83 |
| 5,259,424 | 11/1993 | Miller et al. | 141/4 |
| 5,321,991 | 6/1994 | Kalotay | 73/861.357 |
| 5,409,046 | 4/1995 | Swenson et al. | 141/11 |

*Primary Examiner*—J. Casimer Jacyna
*Attorney, Agent, or Firm*—Townsend and Townsend and Crew LLP

[57] ABSTRACT

The invention embraces a method of tanking or filling of motor vehicles with natural gas and also an apparatus for operating the method of the invention. The motor vehicle includes a tank apparatus (2) with a pressure container (19). A tanking plant (1) includes a storage unit (3) for natural gas, a delivery device (5) and also a connection line (14) which can be connected to the tank device (2). The delivery device (5) includes a control and measuring device (5a), a regulating device (5b) and also an input and output device (5c). The control and measuring device (5a) has a regulating valve (7), a mass throughflow measuring device (8) and also a pressure sensor (9), with these three components being so controlled from the governing regulating device (5b) that the pressure container (19) is filled in a short period of time with natural gas.

18 Claims, 8 Drawing Sheets

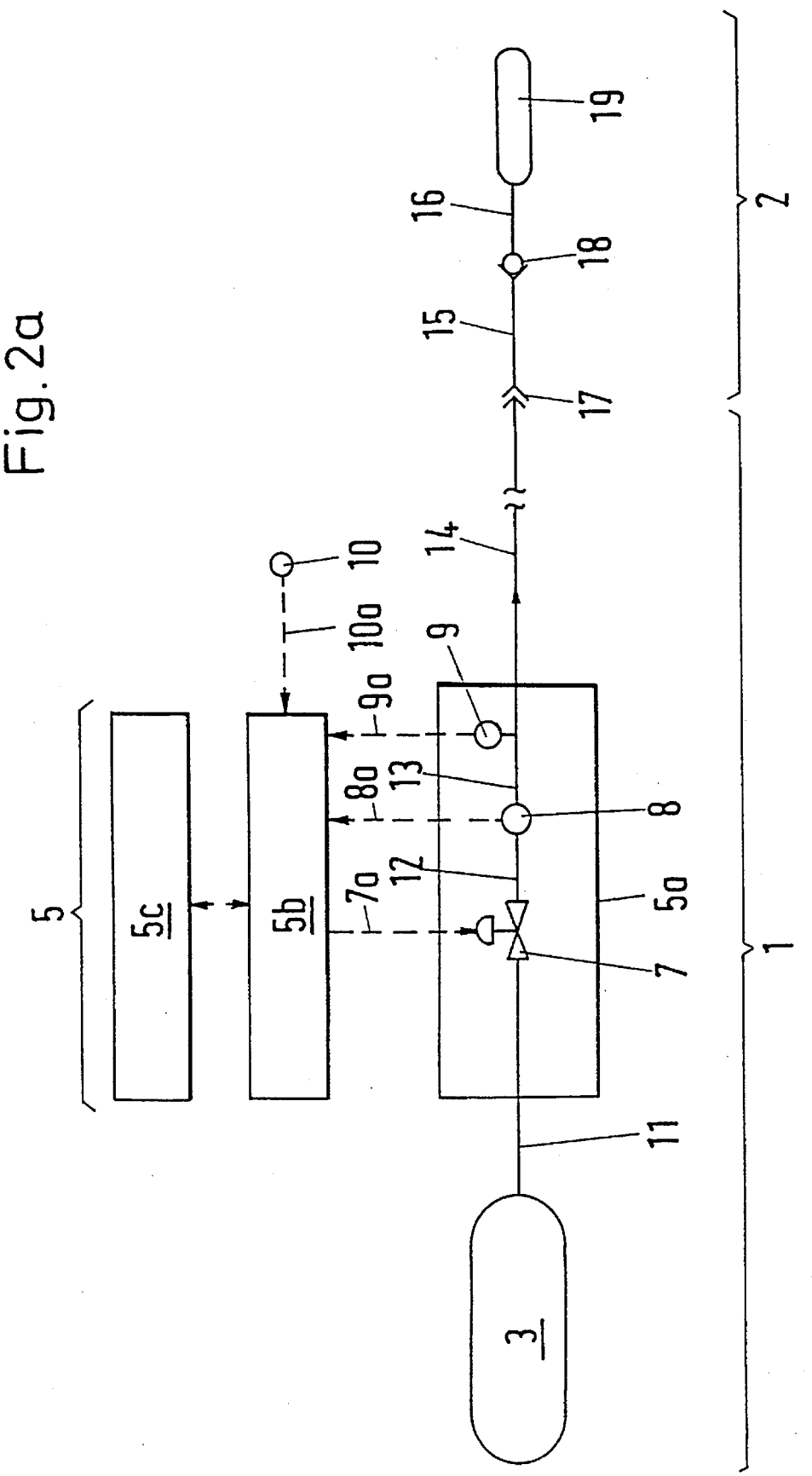

METHOD AND APPARATUS FOR THE RAPID TANKING OF A PRESSURE CONTAINER WITH A GASEOUS MEDIUM

BACKGROUND OF THE INVENTION

The invention relates to a method and an apparatus for the tanking up or refuelling of a pressure container with a gaseous medium. Furthermore the invention relates to tanking apparatus and tanking installations operated using the method and/or including the apparatus. The invention relates in particular to the tanking of motor vehicles operated with gas.

It is known to use a pressure container as a storage means for a gaseous medium. The stored gas is used in a process, for example in a combustion process, so that the pressure container is partly or fully emptied in the course of time and must be directed to a tanking or filling installation in order to be filled up again. Pressure containers as storage means for gaseous media are gaining increasing significance for motor vehicles because they make it possible to use alternative gaseous fuels, such as for example methane, ethane, propane, hydrogen or gas mixtures such as naturally occurring natural gas for the operation of the vehicle. The use of compressed natural gas for the operation of motor vehicles is nowadays increasingly gaining in significance, in particular in countries which have rich natural gas deposits. Motor vehicles can moreover be converted in a very simple manner to operation with natural gas and, when burned, natural gas is characterized by a low pollution combustion in comparison to petrol or diesel, and thus by a reduced environmental burden.

In order to keep the volume of the pressure container at a reasonable size with respect to the motor vehicle it is customary to store natural gas and other gaseous media under a relatively high pressure, for example at 200 bar, related to a reference temperature of 15° C.

The acceptance of such an energy store can be improved amongst motor vehicle owners if one succeeds in tanking the pressure container in a very simple manner comparable to tanking with gasoline. A tanking with natural gas involves substantially more sources of danger in comparison to gasoline because the gas is transferred at high pressure into the pressure container of the vehicle, so that special coupling parts, valves and safety devices are necessary. Furthermore, the aim is to minimize the danger of fire or of an explosion and in particular account has to be taken of the fact that changes of the ambient temperature influence the pressure of the natural gas in the pressure container, so that the pressure could, in the most unfavorable case, rise to an impermissibly high value. It is an extremely demanding operation to fill a pressure container by tanking to approximately 100%, that is to say to fill the pressure container to a preset nominal pressure of for example 200 bar, because the pressure in the pressure container depends on the temperature of the gaseous medium.

A gas tanking apparatus for motor vehicles is known from EP-0-356-377 in which the gas is directly taken from a gas line and compressed with a compressor and directly supplied to a pressure container of a vehicle via a tanking hose and a coupling. The gas pressure is monitored by a pressure sensor which is arranged between compressor and tanking hose. As the tanking procedure takes place very slowly it can be assumed, with the known gas tanking apparatus, that the pressure measured in the gas tanking apparatus between the compressor and the tanking hose corresponds approximately to the pressure in the pressure container of the motor vehicle. The gas tanking apparatus furthermore has a temperature sensor for determining the outer temperature which permits, as a result of a normed association between pressure and temperature, a permissible maximum pressure in the pressure container for the gaseous medium such as natural gas to be computed as a function of the external temperature. The gas tanking apparatus terminates the tanking procedure as soon as the pressure sensor has reached the preset maximum pressure.

As a tanking procedure normally lasts for several hours a temperature compensation takes place so that the temperature of the gas in the pressure container corresponds approximately to the environmental or ambient temperature. A disadvantage of this known gas tanking apparatus is the fact that a complete tanking procedure requires a long period of time, normally several hours. This kind of gas tanking apparatus is for example used for filling the pressure container of motor vehicles overnight.

A further gas tanking apparatus which permits a rapid tanking of a pressure container of a motor vehicle, comparable with tanking with gasoline, is known from WO-93/00264. This apparatus also measures the external temperature in order to determine a permissible maximum filling pressure $p_z$ corrected in accordance with the environmental temperature. As the gas tanking apparatus presses the gas very rapidly into the pressure container of the motor vehicle a pressure drop develops in the supply lines, valves, etc., so that the pressure measured at the output of the gas tanking apparatus of a pressure sensor no longer corresponds to the pressure of the gas in the pressure container. During the filling of gas into the pressure container the inner pressure of the pressure container is thus not detectable. Nevertheless, it must be ensured that the pressure container is filled with gas and that the maximum permitted pressure $p_z$ is not exceeded. The cited publication uses the following method for the tanking of the pressure container:

The pressure container of the motor vehicle is connected via a tanking hose with a gas tanking apparatus, the environmental temperature is measured, from this a corresponding switch off pressure $p_z$ is computed, a small quantity of gas is forced into the pressure container in order to open the non-return valve and thereupon the mass flow of the gas is interrupted. As the non-return valve of the pressure container is now open the pressure $p_{vo}$ in the pressure container can be determined with a pressure sensor which is located in the gas tanking apparatus, since a pressure compensation takes place between the gas tanking apparatus and the pressure container. Thereafter a specific quantity of gas $m_1$ is pressed by the gas tanking apparatus into the pressure container, the mass flow of the gas is again interrupted and the pressure $p_{v1}$ acting in the pressure container is measured by the pressure sensor in the gas tanking apparatus. Based on these two measurement points the volume V of the pressure container is first calculated and then the required mass of gas which is to be supplied in order to fill the pressure container to the predetermined pressure $p_z$. Thereafter the gas forwarding means is set in operation, the required quantity of gas is measured and the tanking procedure is terminated as soon as the calculated quantity of gas has been discharged from the gas tanking apparatus into the pressure container. A substantial disadvantage of this tanking procedure is the fact that it is necessary in a first step to compute the volume of the pressure container and that it is necessary in a second step to calculate the required mass of gas from the volume.

The tanking method uses the known gas equations for calculating the volume of the pressure container.

For an ideal gas: $pV=(m/M)RT$ (1)

For a real gas: $pV=Z(m/M)RT$ (2)

wherein p=pressure
V=volume
m=mass of the gas
M=molecular weight of the gas
R=universal gas constant
T=temperature
Z=gas compression factor The described measuring method detects the two pressures $p_{v1}$, $p_{v0}$ and also the mass $m_1$. Taking account of a real gas the volume of the pressure container V can be calculated in accordance with the following formula:

$$V=(m_1 Z_1 R T_u)/(M (p_{v1}-p_{v0} ((Z_1/Z_0) (T_1/T_0))))$$

with the following relationships applying:

$m_1$=specific known mass of gas
$Z_0$, $Z_1$=gas compression factor at the measuring point 0 and the measuring point 1
R=universal gas constant
$T_u$=environmental temperature
M=molecular weight of the gas
$P_{v0}$, $p_{v1}$=pressure at the measuring point 0 and measuring point 1
T0, T1=temperature measuring point 0 and measuring point 1.

After the volume V of the pressure container has been computed the required mass of gas $m_2$ is calculated which is necessary to fill the pressure container to the calculated pressure $p_z$. In doing so the gas equation is solved in accordance with the mass so that:

$$m_2=V M/R T_u ((p_z/Z_z)-(p_{v1}/Z_1))$$

wherein $Z_z$=gas compression factor at the point $p_z$.

This mathematical method for the calculation of the required mass of gas $m_2$, which calculates the volume V of the pressure container in a first step and the required mass $m_2$ of the gas in a second step, has various disadvantages. Thus it is not possible as a result of purely physical laws to determine the volume V precisely or with adequate accuracy as a result of the formulas that are used, because the values of some of the parameters that are used are not measurable and are thus not known for the following reasons:

1. The temperatures $T_0$ and $T_1$ relate to the temperature of the gas in the pressure container which cannot however be determined with the present method because the customary pressure containers of motor vehicles do not have any integrated temperature sensor. In this respect it can in particular not be assumed that $T_0$ and $T_1$ correspond to the environmental temperature. This is for the following reason: Natural gas is a real gas. If an almost empty pressure container is tanked then the known Joule-Thomson effect occurs which results in the temperature of the gas in the interior of the pressure container dropping rapidly with the initial powerful relaxation of a real gas, so that it is to be assumed that the temperature(s) $T_0$ and/or $T_1$ fall far below the environmental temperature. The situation is quite different when the pressure container is close to filled. Then the gas in the pressure container only relaxes fractionally so that the temperatures $T_0$ and $T_1$ only change a little. The temperatures $T_0$ and $T_1$ are thus strongly influenced by the initial pressure which is present in the pressure container at the start of tanking.

2. Natural gas is a gas mixture which customarily consists of over 90% methane and other components such as ethane, propane, butane, nitrogen, carbon dioxide, etc. It is known that the composition of a natural gas drawn from a public gas supplier can fluctuate daily. This has the consequence that both the molecular weight of the gas M and also the gas compressibility factor Z may not be assumed to be constant.

The described method thus has the disadvantage that the volume V of the pressure container cannot be accurately calculated as a result of physical laws, and, for the same reasons, the additional mass $m_2$ to be filled in is also not accurately computable. A decisive disadvantage of the known method is thus the fact that the additional mass $m_2$ which is filled into the pressure container generates a pressure in the pressure container which can lie in a wide range of scatter about the desired pressure $p_z$. Dangers can then arise when the pressure in the pressure container rises to substantially above the maximum permitted pressure $p_z$. It is however also disadvantageous when the pressure in the pressure container remains below the maximum permitted pressure $p_z$, because the pressure container could then take up more gas for a complete filling.

It is known that the heating or cooling of the gas in the pressure container, in particular when filling an empty tank, starts with a rapid dynamic process at the beginning of the tanking procedure. The gas relaxes during filling into the pressure container and thereby cools down quickly. At the same time a heat exchange takes place between the warmer wall of the pressure container and the gas. This highly dynamic process typically takes place during the first 30 seconds of the filling process. If the filling is interrupted then an equilibrium sets in again between the temperature of the outer wall of the pressure container and the gas. A disadvantage of the known method is thus the fact that for determining the two measurement points $p_{v0}$, $p_{v1}$ a relatively small specific mass of gas $m_1$ must be supplied to the pressure container at the start of the tanking process. Directly after the supplying of the mass of gas $m_1$ the pressure $p_{v1}$ is measured and this value is afflicted with a large degree of uncertainty. The subsequent calculation of the volume V and also of the mass $m_2$ is thus correspondingly subject to error.

A further disadvantage of the known method is the fact that the mass flow of gas is determined in accordance with the principle of the "sonic nozzle". For the precise measurement of the throughflowing mass flow a correspondingly high pressure drop of the gas across the "sonic nozzle" is necessary.

The pressure in the preceding storage tank must be kept at a correspondingly high value. The gas must be compressed to a higher degree in the preceding storage tank, which requires an increased energy requirement for the compression. Furthermore the elevated pressure in the storage tank leads, with an empty pressure container, to a very pronounced Joule-Thomson effect, so that the gas in the pressure container is cooled down to very low temperatures shortly after the start of tanking, which is why the danger exists that the water and methane crystallize to hydrates and these crystalline structures coat or block the supply lines, coupling points or valves.

SUMMARY OF THE INVENTION

It is therefore an object of the present invention to propose a method and an apparatus which make it possible to tank the pressure container in a short period of time with a gaseous medium to a presettable filling pressure $p_z$ without the need to determine the volume of the pressure container. The method should in particular be suitable to take account of the influence of the temperature of the gas on the filling pressure $p_z$.

In accordance with the present invention a specific quantity of gas is forced into the pressure container a plurality of times, one after the other; thereafter a valve is closed and the pressure prevailing in the pressure container is detected with a pressure sensor located in the gas tanking apparatus. The relationship between the infilled mass of gas $m_i$ and the pressure $p_i$ prevailing in the pressure container is refined with each further measurement starting from the original two measurement points and a curve can be plotted through these support points and can be evermore precisely extrapolated with known mathematical methods such as the method of the smallest quadratic error. Thus, as the filling process proceeds the relationship between the mass and pressure for the respective pressure container becomes known with increasing accuracy, and can therefore be reliably extrapolated, so that the pressure container can be filled very accurately to the presettable pressure $p_z$. This method has the decisive advantage that only the association between the mass m and the pressure p needs to be determined, i.e. the volume V of the pressure container never has to be calculated. Thus no calculation liable to error is necessary. The calculation can be directly based on physical parameters in the pressure container which results in a reliable and reproducible method, in particular when gas compositions or gas characteristics change as is true for natural gas. A substantial advantage of the method of the invention is thus the fact that it can be used independently of the gas characteristics and that it is also suitable for other gases, such as for example methane, ethane or hydrogen which may be used to fill a pressure container.

The characteristic of the present method of the invention, of being able to tank a pressure container with gas very accurately up to a preset of a pressure $p_z$, can be advantageously used to take account of the temperature increase of the gas which occurs during tanking.

As already described an admissible filling pressure $p_z$ is calculated prior to the tanking procedure as a result of the external temperature T, or of the environmental temperature $T_u$ respectively. For this one uses a preset temperature-pressure characteristic for pressure containers which is known for different gases and thus also for natural gas. With such a temperature-pressure characteristic a reliable filling pressure $p_z$ can be calculated with a known measured value of the environmental temperature $T_u$. During tanking the gas in the pressure container normally warms up to a temperature which lies above the outside temperature. Thus the effect occurs that when a pressure container is tanked to a permissible filling pressure $p_z$ and the tanking procedure is terminated, the gas in the pressure container subsequently cools down to the outside temperature, which permits the filling pressure $p_z$ in the pressure container to sink, so that the pressure container is not fully filled after it cooled down to the outside temperature. This behavior of the gas is taken into account in the present tanking process so that a short term overtanking—that is to say a tanking to a filling pressure $p_z$ which lies above the permissible filling pressure—is permitted. This is done in such a way that the pressure container has the permissible filling pressure $p_z$ after cooling down to the external temperature.

For this purpose a temperature increase ($\Delta T$) to be expected in the pressure container is calculated by means of a mathematical relationship which includes at least the parameters of the initial pressure $p_{v0}$, the permissible filling pressure $p_z$ and the outer temperature T and/or the environmental temperature $T_u$. From this a corrected admissible filling pressure $p_{z1}$ is determined. The pressure container is tanked to a corrected permissible filling pressure $p_{z1}$, so that after the cooling down of the gas to the outside temperature, or to the preset reference temperature, the pressure container has the permissible filling pressure $p_z$.

BRIEF DESCRIPTION OF THE DRAWINGS

FIG. 2a shows an embodiment of an apparatus for tanking constructed in accordance with the present invention;

DESCRIPTION OF THE PREFERRED EMBODIMENTS

The method of the invention detects the supplied mass of gas several times during a tanking procedure in discrete steps, and also the pressure prevailing in a pressure container, and determines from these measured values, during the tanking procedure which is taking place, the relationship between mass and pressure for the respective pressure container.

From the gas equation for real gases (2) the relationship between the pressure p and the mass m is known:

$$p/m = (ZRT)/(MV).$$

Figure 1A:
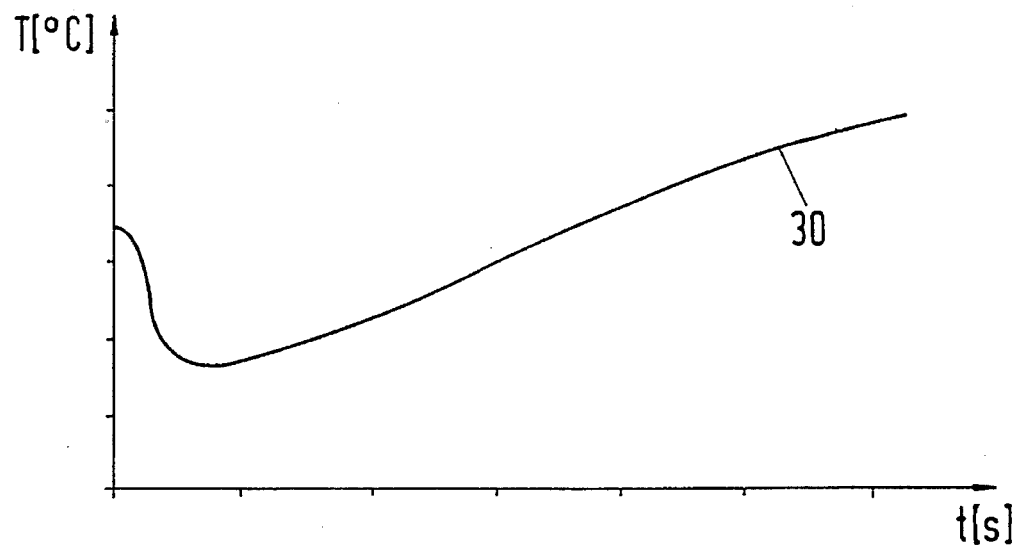
FIG. 1a is a temperature plot for a gas in a pressure container as a function of the time.

The parameters R, M and V are constant for a specific pressure container and during a tanking procedure, so that the pressure p as a function of the mass m depends on the temperature T and also on the gas compression factor Z. These two factors are characterizsed by a non-linear behavior for real gases, so that for real gases a non-linear relationship exists between mass m and pressure p. The plot 30 of the temperature T of the gas in the pressure container as a function of the time t is represented for a tanking procedure in FIG. 1a. The pressure container which is tanked from a storage tank with approximately constant pressure is almost empty at the start of tanking, so that the gas first cools down quickly as a consequence of the Joule-Thomson effect. The more gas that is supplied the more the gas is compressed again, so that the temperature of the gas in the pressure container rises with increasing filling. The course taken by this functional relationship is further influenced by the temperature exchange between the gas and the wall of the pressure container. Furthermore, the course taken by this functional relationship is dependent on the initial pressure which prevailed in the pressure container at the start of the tanking procedure.

Figure 1B:
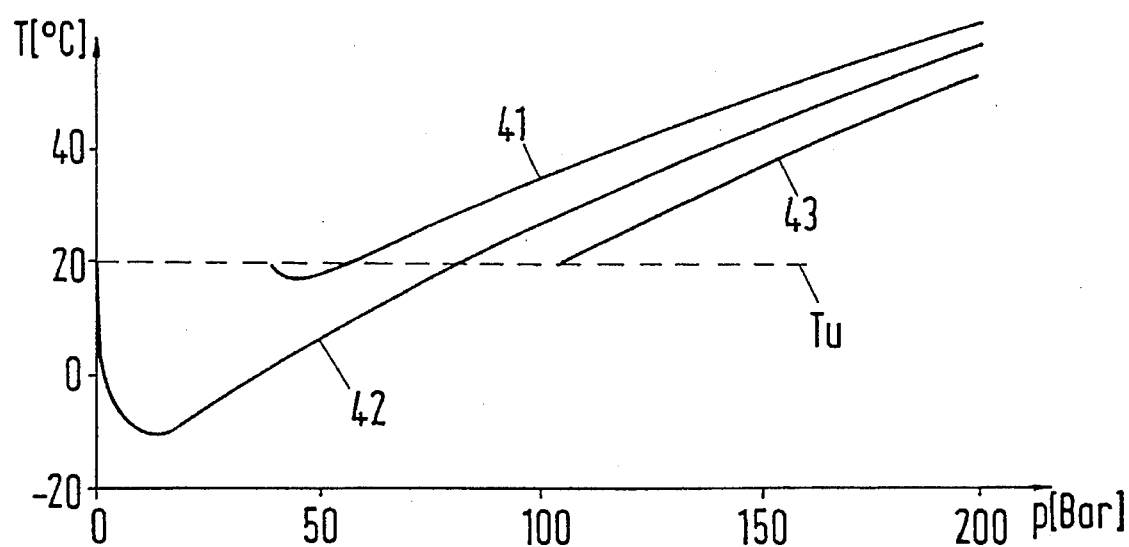
FIG. 1b is a temperature plot of a gas in a pressure container as a function of the pressure.

The influence of the initial pressure prevailing in the pressure container at the start of the tanking procedure on the heating up of the gas is illustrated in FIG. 1b. The pressure in the storage tank amounts to 250 bar. The environmental temperature $T_u$ amounts to 20° C. FIG. 1b shows the plot of the temperature T of a gas in a pressure container as a function of the pressure p. For the curve 41 the pressure in the pressure container at the start of the tanking procedure amounts to 40 bar. For the curve 42 the initial pressure amounts to 0 bar and for the curve 43 the initial pressure amounts to 100 bar. The temperature plot, and also the end temperature of the gas in the pressure container directly after termination of the tanking procedure, thus depends on the pressure in the pressure container at the start of the tanking procedure. From the course of the curve 42 one can see a pronounced Joule-Thomson effect. In the course of the curve 41 this effect has a substantially smaller influence on the temperature plot at the start of the tanking procedure, whereas this effect is completely irrelevant for the curve 43.

Figure 1C:
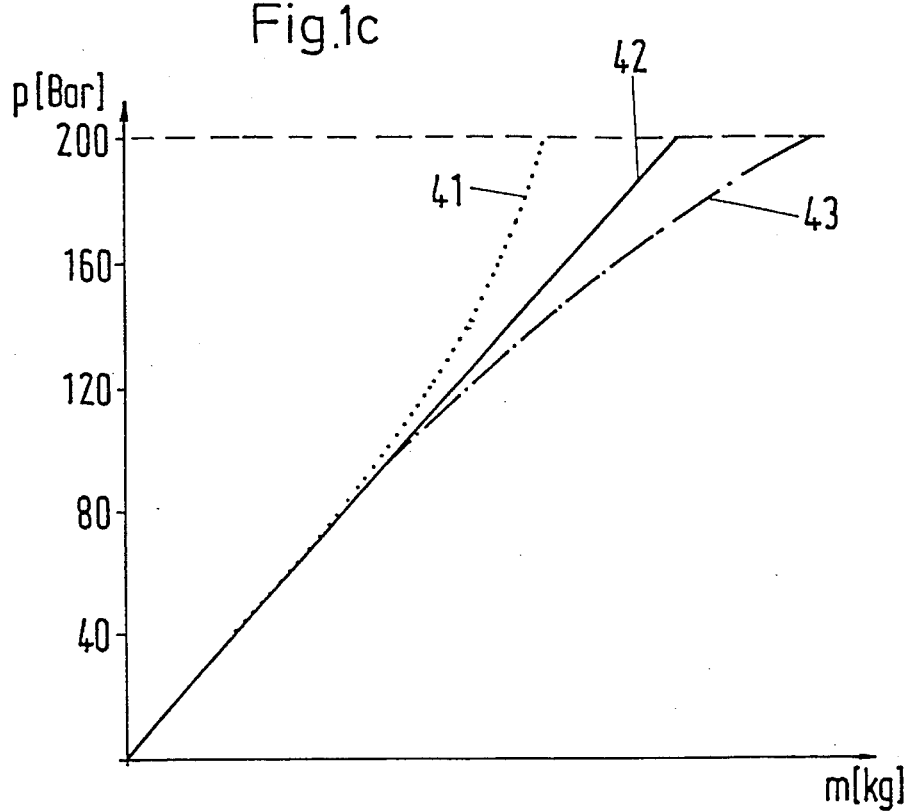
FIG. 1c shows several plots of the pressure in the pressure container as a function of the supplied mass with different starting pressure for the filling procedure.

FIG. 1c shows the plot for the mass m of a gas as a function of a pressure p for the same tanking procedure illustrated in FIG. 1b. In order to make the effects clearer the plots of the curves 41, 42, 43 are exaggerated. The curve 42 starts at the initial pressure of the pressure container of approximately 0 bar and shows a plot which can be termed linear to a first approximation. The curve 41 starts at an initial pressure of the pressure container of about 40 bar and has a progressively increasing gradient over its course. The curve 43 starts at an initial pressure of the pressure container of about 100 bar and has a reducing gradient. Thus a non-linear relationship exists between the pressure p and the mass m, with the course of the gradient being dependent on factors such as the initial pressure in the pressure container or, as shown in FIG. 1b, of the temperature T of the gas in the pressure container.

For a better understanding of the method an apparatus for the operation of the method of the invention is first illustrated in FIG. 2a. A tanking installation 1 serves for the tanking of a mobile tank apparatus 2 with a gaseous medium. The mobile tank apparatus 2 is, in the present example, built into a motor vehicle. The tanking apparatus 2 includes a connection device 17 which is connected via a connection line 15 to a non-return valve 18 which is in turn connected via a connection line 16 to a pressure container 19. For the tanking of the pressure container 19 a pressure-tight connection line 14 belonging to the tanking plant 1 is connected to the connection device 17, so that gas can be supplied to the pressure container 19. The tanking plant includes a storage unit 3 in which a gaseous medium, in the present example natural gas, is stored at a pressure of over 200 bar. A non-illustrated compression apparatus fills the storage unit 3 with natural gas again as required. The storage unit 3 is connected via a connection line 11 with a control or measuring apparatus 5a which is a component of a delivery device 5. The control or measuring apparatus 5a has a regulating valve 7 which can be controlled via a control line 7a from a regulating device 5b which is likewise a component of the delivery apparatus 5. The regulating valve 7 is connected via a gas line 12 with a mass throughflow measuring device 8, the measurement signal of which is supplied via a measurement line 8a of the regulating device 5b. The mass throughflow measuring device 8 is followed by a connection line 13 which passes outside of the control and measurement device 5a into the pressure-tight connection line 14. The connection line 14 is executed as a flexible hose, the one end of which can be connected with the connection device 17. A pressure sensor 9 is connected to the connection line 13 and sends a measurement signal via the measurement line 9a to the regulating device 5b. Furthermore, a temperature sensor 10 for determining the environmental or ambient temperature $T_u$ is provided and its measurement signal can be supplied via a measurement line 10a to the regulating device 5b. The delivery device 5 has the task of filling the pressure container 19 with gas, with the filling pressure being specified or presettable. The delivery device 5 has an input and output means 5c with input devices in order, for example, to set the plant in operation, and also with output devices on which, for example, the mass of the tanked gas or the price of the gas are indicated. The input and output device 5c is connected with the regulating device 5b which in turn regulates the control or measuring device 5a in such a way that the pressure container is filled with gas. The regulating apparatus 5b has a microprocessor with RAM, ROM and input/output means.

Figure 2B:
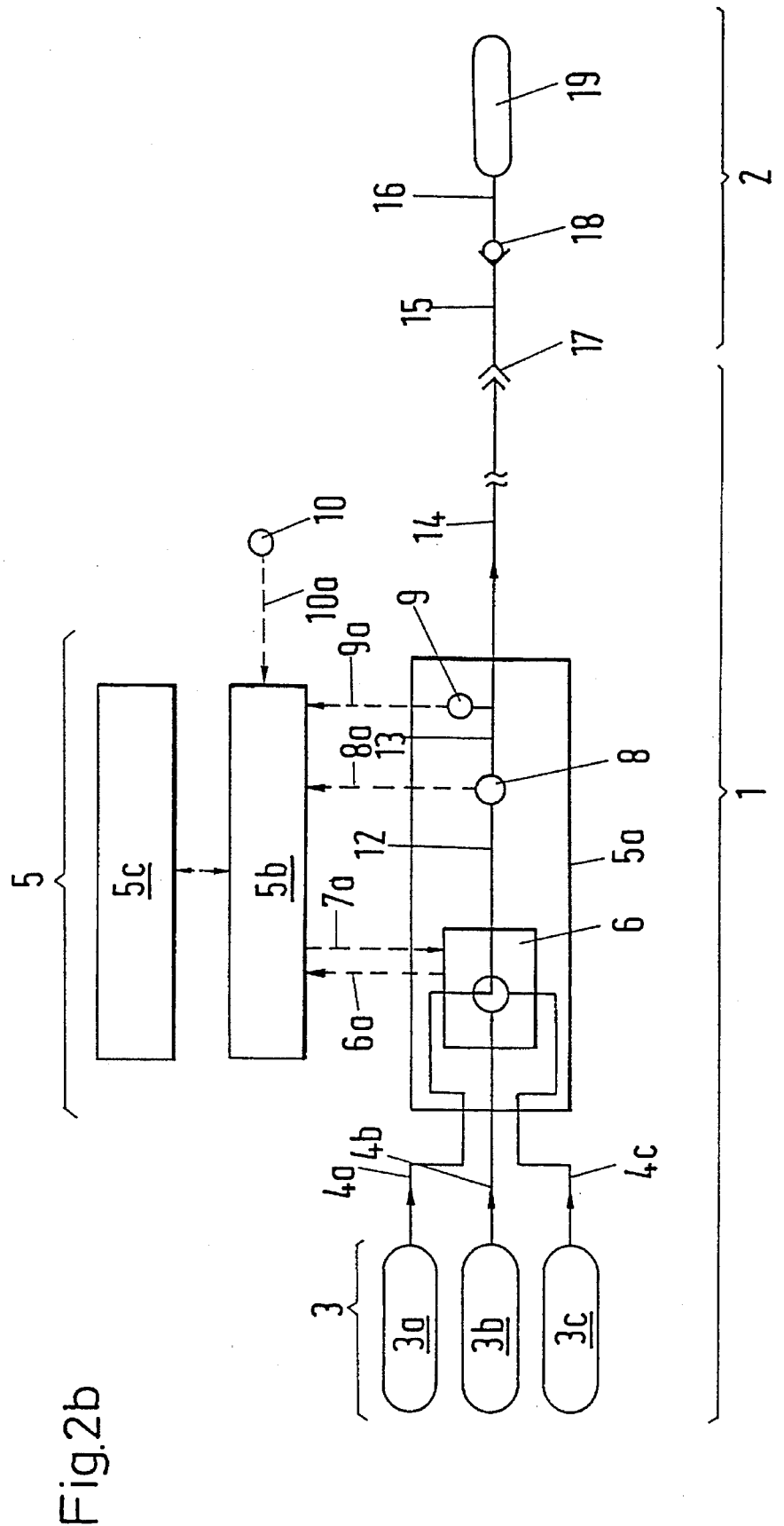
FIG. 2b shows a further embodiment of an apparatus for tanking with storage tanks of different pressure.
Figure 3A:
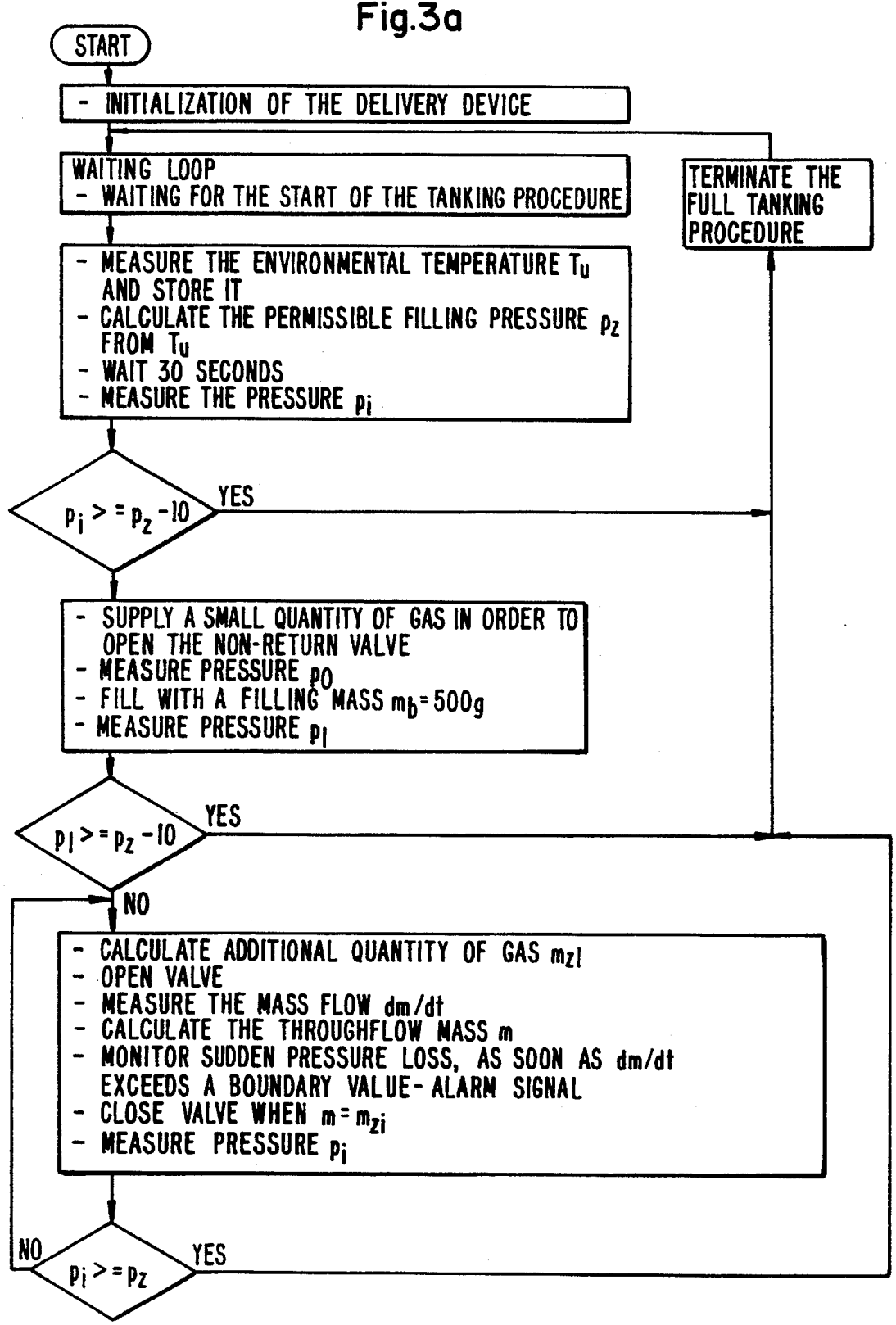
FIG. 3a is a flow diagram of a method for operating the tanking apparatus.

FIG. 3a shows a flow diagram for a method for operation of the apparatus of FIG. 2a. The method of the invention for tanking a pressure container 19 is illustrated in detail in FIG. 1d together with FIG. 3a with respect to an embodiment. As a method embodiment the special case is illustrated in which the tanking procedure runs along a curve in accordance with curve 41. The method can however also be used for curves in accordance with curve 42 or 43. For better illustration of the effects the curve is exaggeratedly illustrated. The pressure container has an initial pressure of 40 bar. The filling pressure amounts to 200 bar at a reference temperature of 15° C.

The method for rapid tanking of a pressure container 19 with a gas which is available at a pressure of over 200 bar relative to the pressure container 19 consists of the following steps:

1. The pressure-tight connection line 14 of the tanking plant is connected to the pressure container 19.

2. The temperature sensor 10 measures the environmental temperature $T_u$ from which the regulating device 5b calculates, on the basis of a predetermined temperature-pressure characteristic for the pressure container 19, a temperature corrected filling pressure $p_z$ to which the pressure container 19 is to be filled.

3. The valve 7 is opened to supply a small quantity of gas, for example 100 g, to the pressure container 19 and is then closed again. During this the non-return valve 18 is opened so that a pressure balance takes place with the connection line 14, and thereby the pressure in the pressure container 19 can be measured with the pressure sensor 9 which is located in the control or measuring device 5a. This first pressure measurement results in the first measurement point $p_0$.

4. A specific mass of gas $m_b$, for example 500 g, is supplied to the pressure container 19, the valve 7 is closed again and the pressure $p_1$ prevailing in the pressure container 19 is measured. Should the pressure difference $p_1$ minus $p_0$ lie beneath a predeterminable value then a mass of gas is supplied at least once more until a presettable pressure difference has been achieved. This is necessary in order to achieve a clear pressure rise with large pressure containers 19.

5. In a further step an additional mass of gas $m_z$ is determined which is to be filled into the pressure container 19. The additional mass of gas $m_{z1}$ is for example calculated by extrapolation of the plot of the already measured measurement points. A mathematical function is laid through the two measurement points, for example a straight line 50, and a mass of gas $m_{v1}$ is determined by extrapolation of this straight line up to the filling pressure of $p_z$. In the event that a curve shape in accordance with curve 41 results, the linear extrapolation leads to too large a mass of gas $m_{v1}$. A tanking of the pressure container 19 with this calculated mass of gas $m_{v1}$ would generate a pressure $p_{v1}$ in the pressure container which lies far above the permissible pressure $p_z$. In order to ensure that the pressure comes to lie beneath the filling pressure $p_z$ during the subsequent filling procedure a fraction, for example 25% or 50% of $m_{v1}$, is assumed for the additional mass of gas $m_{z1}$.

6. The additional mass of gas $m_{z1}$ is filled into the pressure container 19 and thereupon the pressure $p_2$ is determined. Thus a further support point is known via the relationship between mass m and pressure p. A mathematical function is laid through the known support points, in the present example a straight line through the points $(m_1, p_1)$ and $(m_2, p_2)$. This function is in turn extrapolated up to the filling pressure $p_z$ and from this a mass of gas $m_{v2}$ and therefrom a new additional mass of gas $m_{z2}$ is determined which is supplied to the pressure container 19.

Figure 1D:
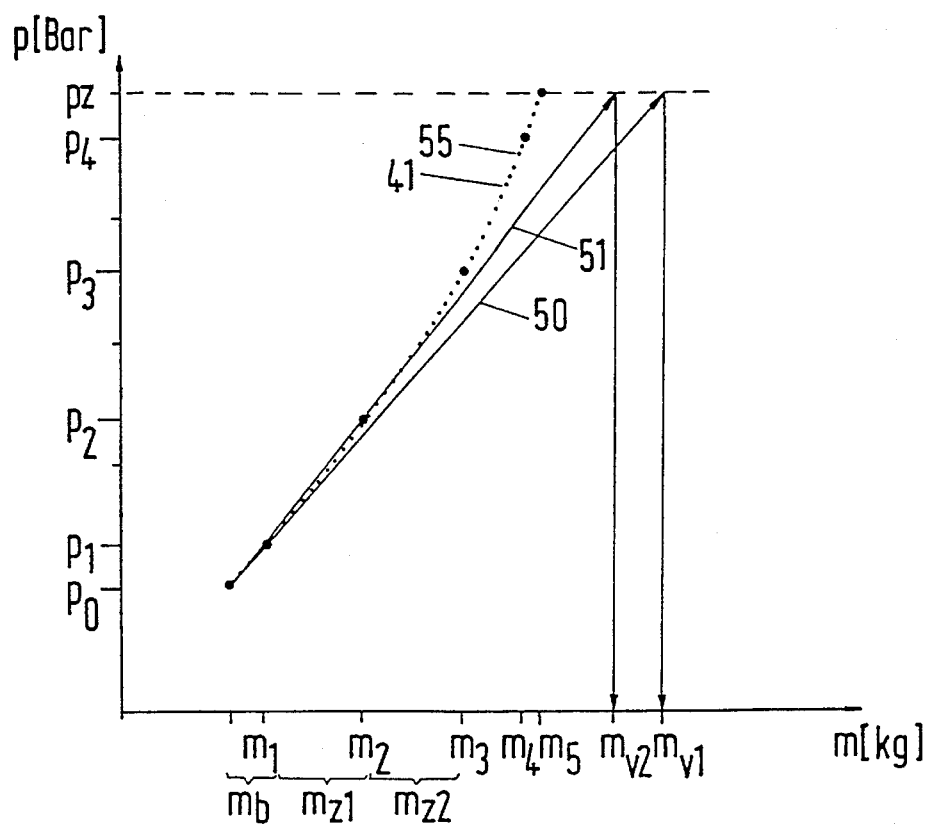
FIG. 1d shows a plot of the pressure in the pressure container as a function of the supplied mass with a specific starting pressure in the pressure container.
Figure 3B:
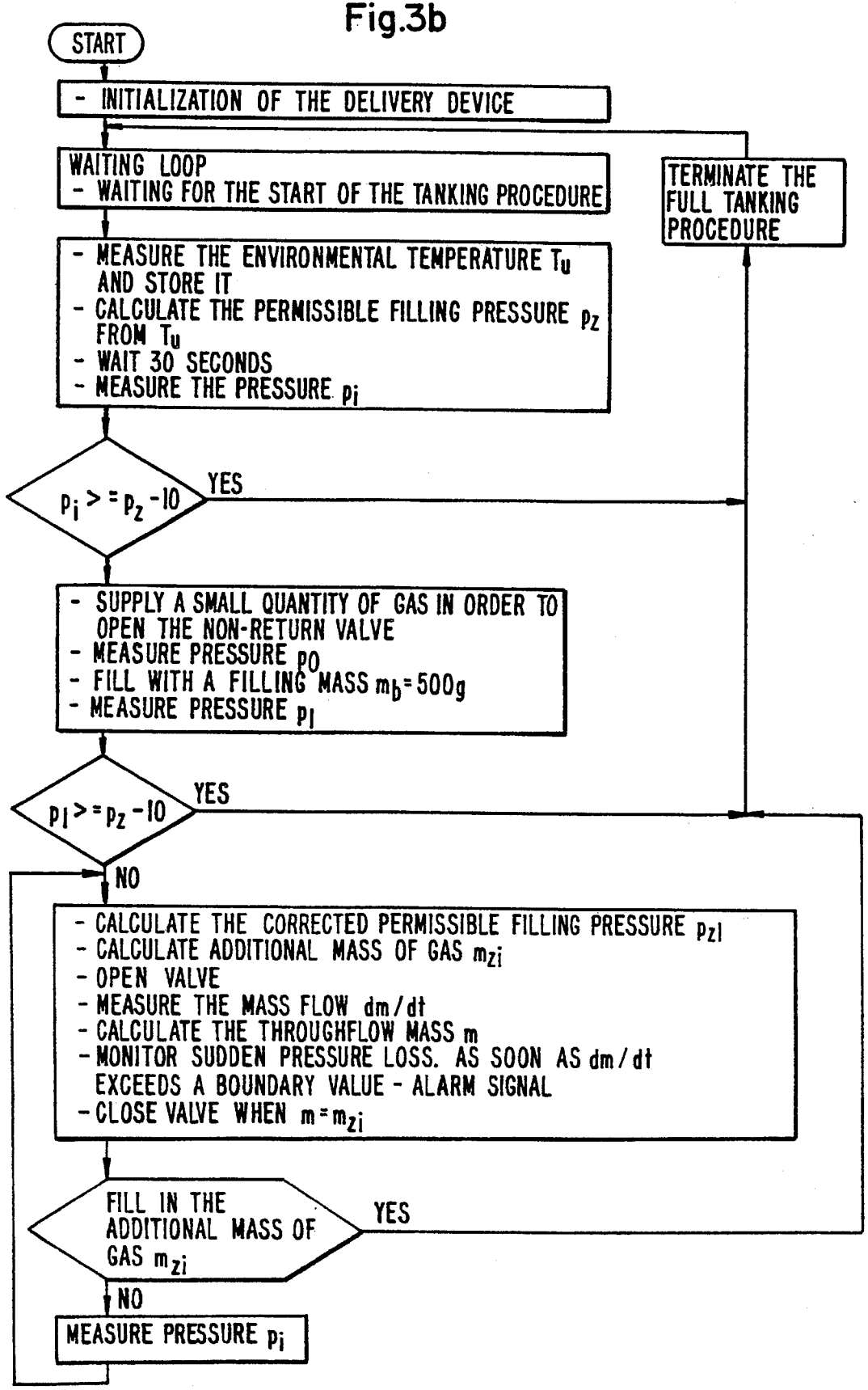
FIG. 3b is a flow diagram of a further method for operating the tanking apparatus.

7. The preceding step 6 can be carried out several times after one another and in each case a new additional mass of gas $m_{zi}$ determined. In this respect, as illustrated in FIG. 1d, the plot of the relationship between the mass m and the pressure p becomes progressively better known during the filling procedure. A mathematical function of higher order 55 can be laid through the known measurement points in place of a straight line and can be adequately accurately matched to the plot of the measurement points, for example with the method of the least mean square deviation. In this way the relationship between the mass m and the pressure p can be increasingly more precisely extrapolated so that the additional masses of gas $m_{zi}$ can be determined in such a way that the pressure container 19 is adequately accurately filled to the filling pressure $p_z$. The tanking procedure can be terminated by two different criteria either as soon as the filling pressure $p_z$ is present, which can be determined by measuring the prevailing pressure p (as shown in FIG. 3a) or as soon as an additional mass of gas $m_{zi}$ has been filled in for which it was previously calculated that it would permit the pressure in the pressure container to rise approximately to the filling pressure $p_z$ (as is illustrated in FIG. 3b). During the tanking procedure it can be determined, as a result of the plot of the gradient between the mass m and the pressure p, whether the filling procedure has a curve in accordance with curve 41, 42 or 43. This is taken into account in the extrapolation proceedings in the calculation of the additional mass of gas $m_{zi}$.

Thus, the pressure container 19 can be tanked with a filling pressure $p_z$ without the need to know or to calculate the volume V of the pressure container 19. This method is moreover independent of characteristics of the gas that is used. It is known that the composition of natural gas can fluctuate daily, which also correspondingly influences the relationship between m and p. Furthermore, it was shown in FIG. 1c, by way of the curves 41, 42 and 43, that the relationship between m and p depends on the initial pressure in the pressure container 19. The fact that the relationship between m and p is continually newly detected during the tanking procedure means that a pressure container 19 can always be reliably tanked with a filling pressure $p_z$, independently of the respectively prevailing physical boundary conditions such as the initial pressure in the pressure container, the gas composition, temperature or pressure of the gas in the storage unit.

FIG. 2b shows a further embodiment of a tanking installation 1. In distinction to the embodiment of FIG. 2a the storage unit 3 has three storage tanks 3a, 3b, 3c which are connected to a change-over device 6 via connection lines 4a, 4b, 4c. The change-over device 6 respectively connects one of the connection lines 4a, 4b, 4c with the subsequent connection line 12, with the change-over device 6 also being able to adopt intermediate positions in order to interrupt the gas flow to the connection line 12. The change-over device 6 is controlled via the control line 7a from the regulating device 5b. A measurement line 6a transmits the position of the change-over device 7 to the regulating device 5b. The three storage tanks 3a, 3b, 3c can store a gas at respectively differing pressures, with the storage tank 3a having the lowest pressure, and the storage tank 3c having the highest pressure. Furthermore, it is possible that the three storage tanks 3a, 3b, 3c are filled in the same manner and in this respect have the same pressure after the filling procedure. The three storage tanks 3a, 3b, 3c can be differentially emptied during the following tanking procedures, so that the three storage tanks 3a, 3b, 3c have different pressures after a certain time which are first balanced out again during a subsequent filling procedure.

The pressure container 19 can be tanked in such a way that one starts with the storage tank 3a which has the lowest pressure and during the tanking procedure respectively changes over to a storage tank with higher pressure as soon as the mass flow through the mass throughflow measuring device 8 falls below a predeterminable value. The advantage of such a tanking arrangement is to be seen in the fact that the compression energy which has to be provided for the gas pressure in the storage tanks 3a, 3b, 3c can be kept small.

The pressure container 19 can also be tanked in such a way that the temperature of the gas in the pressure container 19 adopts a value as small as possible after the tanking procedure, which is in particular as close as possible to the environmental temperature. This can be achieved in accordance with FIG. 1b in that the storage tanks 3a, 3b, 3c are controlled in such a way that the filling process takes place along a curve 43 or a curve 42. This can require higher pressures in the storage tanks 3a, 3b, 3c in order, for example, to permit a process in accordance with the curve 42 with a pronounced Joule-Thomson effect to occur several times during the filling procedure. With an increased compression energy and the corresponding tanking method the temperature of the gas in the pressure container 19 can be lowered.

In the embodiments of FIGS. 2a and 2b further components which are obvious to a person skilled in the art are not shown, such as, for example, the compression device for the storage tank, pressure and temperature sensors associated with the storage tanks or a ventilation system in order to ventilate the pressure-tight connection line 14 after tanking.

Figure 2C:
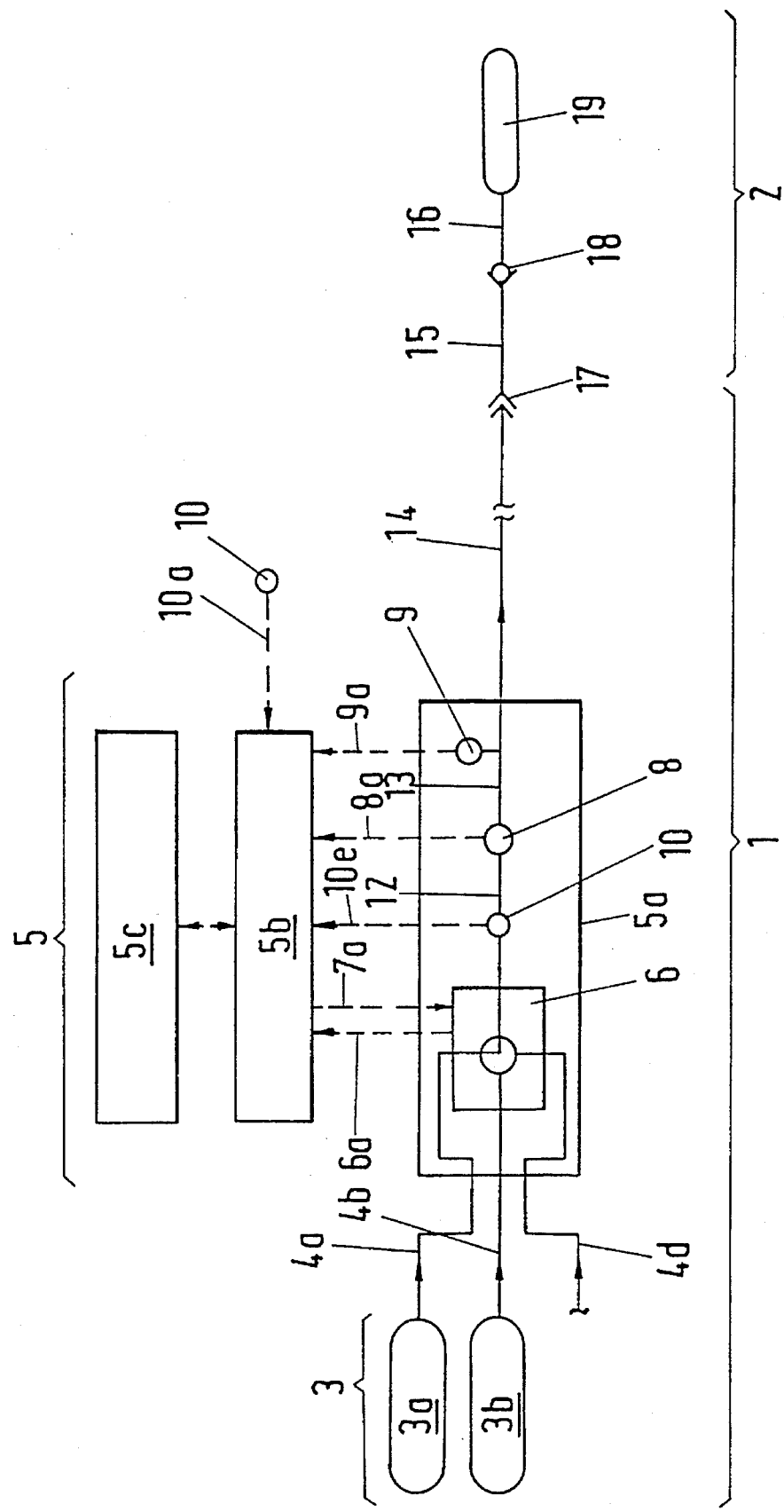
FIG. 2c shows a further embodiment with an apparatus for tanking with storage tanks of different pressure.

FIG. 2c shows a further embodiment of a tanking plant 1 with a temperature sensor 10 for detecting the gas temperature, the temperature sensor 10 being arranged at the connection line 12. The value of the temperature sensor 10 is passed to the regulating device via the signal line 10e. Furthermore, the regulating device 5b can detect measurement signals from pressure sensors which detect the pressure in the storage tanks 3a and 3b. The connection line 4d is directly fed from a compressor. If, for example, the pressure in the storage tank 3a and/or 3b falls below a certain value then the gas coming from the compressor can be directly supplied to the control and measurement device 5a via the connection line 4d. The arrangement of the temperature sensor 10 in the connection line 12 ensures that the temperature of the gas flowing through the control device 5a is continuously measurable.

The mass throughflow measuring device 8 comprises a mass throughflow measuring instrument based on the Coriolis principle. In this way a mass flow dm/dt is detected so that the mass which is filled in can be precisely calculated with the regulating device 5b. Naturally other mass throughflow measuring devices 8, which are based on other measurement principles, are also suitable for use in the method of the invention or in the apparatus operated in accordance with the method.

Figure 1E:
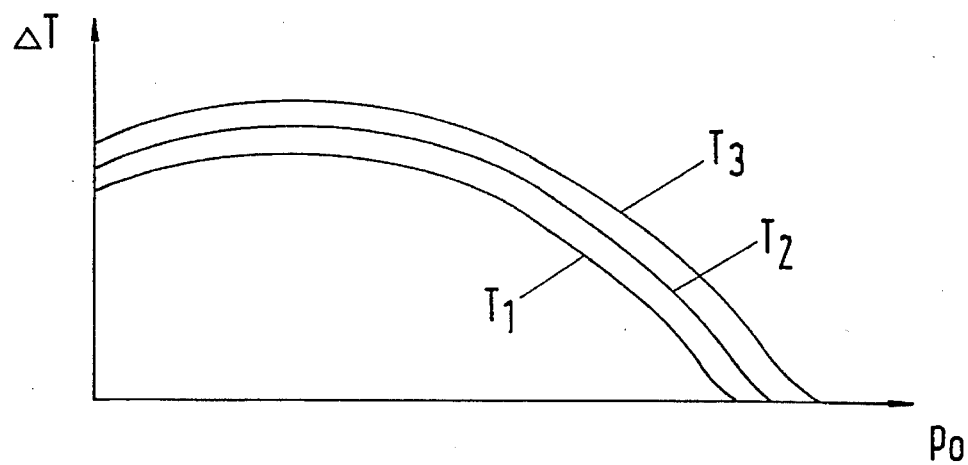
FIG. 1e shows a field of characteristics for calculating the temperature increase ($\Delta T$) to be expected.

The temperature increase of the gas in the pressure container which can arise during a tanking procedure was illustrated and described with the aid of FIG. 1b. In FIG. 1e the same physical association is shown again but differently. FIG. 1e shows a mathematically or empirically derived association between the temperature increase ($\Delta T$) which is to be expected as a function of the intitial pressure $p_0$, of the filling pressure $p_z$ and also of the environmental temperature $T_u$. Different environmental temperatures $T_u$ are shown as the temperatures $T_1$, $T_2$ or $T_3$.

From the temperature increase ($\Delta T$) which is to be expected a corrected permissible filling pressure $p_{z1}$ can be computed via the known normed relationship between pressure and temperature. The tanking procedure illustrated in FIG. 1 assumes that it is permissible to tank the pressure container in the short term above the permissible filling pressure $p_z$, if account is taken of the fact that the gas present in the pressure container will cool down to the environmental temperature $T_u$ relatively quickly after the termination of the tanking procedure, and that the pressure of the gas will thereby sink to the permissible filling pressure $p_z$.

For reasons of safety the pressure generated in the pressure container may not exceed a certain maximum value in order to avoid damaging the pressure container.

Figure 1F:
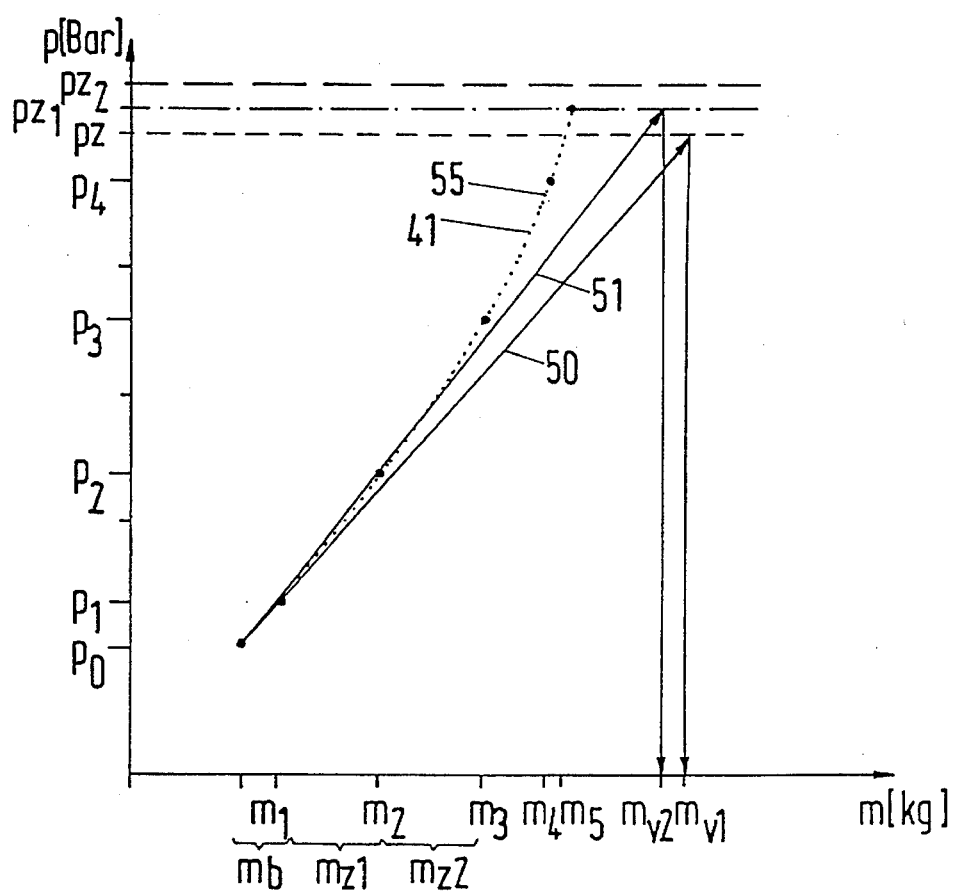
FIG. 1f shows a plot of the pressure in the pressure container as a function of the supplied mass with a corrected permissible filling pressure.

In the tanking procedure of FIG. 1f an extrapolation is made during the tanking procedure in a first extrapolation illustrated by the straight line 50 to the permissible filling pressure $p_z$ in order to determine a mass of gas $m_{v1}$. Thereupon an additional mass of gas $m_{z1}$ is filled in, the tanking procedure is interrupted, the prevailing pressure $p_2$ is measured, then a temperature increase ($\Delta T$) to be expected is calculated from which a corrected admissible filling pressure $p_{z1}$ is calculated. Thereafter the straight line 51 which connects the points ($m_1$, $p_1$) and ($m_2$, $p_2$) is extrapolated to the corrected admissible filling pressure $p_{z1}$ in order to calculate a mass of gas $m_{v2}$ and from this a new additional mass of gas $m_{z2}$ which are supplied to the pressure container 19. The further filling procedure proceeds along the curve 41, with the discrete points on the curve 41 corresponding to measured values (pressure, mass) on the curve 41, until the gas in the pressure container has the corrected admissible filling pressure $p_{z1}$.

The temperature increase ($\Delta T$) to be expected can be calculated just once during the entire tanking method, or also more than once, and a corrected permissible filling pressure $p_{z1}$ can be calculated from this. It is evident from FIG. 1a that the heating of the gas in the pressure container is also a function of time t. A temperature exchange is continuously taking place between the gas and the wall of the pressure container. If the temperature of the gas and the pressure container is for example higher than the temperature of the wall then the gas is cooled down as a function of the time t. This process of thermal dissipation as a function of time can be mathematically illustrated, for example, by a reducing e-function. The required tanking time $t_f$ for the filling of the pressure container can be approximately estimated so that the temperature reduction ($\Delta T2$) to be expected which occurs by the thermal dissipation of the pressure container during the tanking time $t_f$ can be calculated via the e-function. A corrected permissible filling pressure $p_{z1}$ can be calculated from the value of the temperature reduction ($\Delta T2$) based on a predetermined temperature-pressure characteristic for pressure containers. Moreover, a corrected permissible filling pressure $p_{z1}$ already calculated in accordance with FIG. 1e can be further corrected on the basis of the tanking time $t_f$ and newly calculated.

The filling pressure can be corrected by a further method, so that, as shown in FIG. 1f, a further corrected filling pressure $p_{z2}$ is calculated. In doing this the temperature $T_g$ and also the mass m of the supplied gas are continuously measured in the delivery device 5, from this an average gas temperature $T_d$ of the supplied gas is calculated, and, based on a predetermined temperature-pressure characteristic, a corrected permissible filling pressure $p_{z2}$ is calculated from the difference of the environmental temperature $T_u$ and the average gas temperature $T_d$ and the pressure container is filled with gas up to this pressure. A tanking plant 1 in accordance to FIG. 2c is for example suitable for determining the average gas temperature $T_d$.

FIG. 3b together with FIG. 1f shows a method for the tanking of a pressure container. The method shown in FIG. 3b calculates for each run through the illustrated loop a newly corrected permissible filling pressure $p_{z1}$ and the loop is first left as soon as the last additional mass of gas $m_{zi}$ has been filled in, which was calculated to fill the pressure container to a pressure $p_{z1}$. It can however also prove advantageous to calculate the corrected permissible filling pressure $p_{z1}$ or $p_{z2}$ only once during a tanking procedure.

Furthermore a permissible filling pressure $p_{z3}$ can be calculated in which both the permissible filling pressure $p_{z1}$ and also the permissible filling pressure $p_{z2}$ are taken into account, so that the filling pressure $p_{z3}$ takes account of both correction methods.

What is claimed is:

1. A method for rapidly filling a pressure container with pressurized gas comprising the steps of adding an initial mass of the pressurized gas to the container; measuring an initial pressure in the container after the initial mass has been added; with the initial mass and the initial pressure, and without calculating a volume of the container, determining a total mass of the pressurized gas which is to be added to the container to raise the pressure in the container to approximately its rated pressure, directing a first portion of the total mass into the container, measuring a first pressure in the container after the first portion has been added, with the first pressure and the first portion of the total mass, determining a remainder of pressurized gas required to raise the pressure in the container to approximately its rated pressure; and thereafter flowing the remainder of the pressurized gas into the container.

2. A method according to claim 1 including the step of terminating the flowing step in response to flowing the remainder of the pressurized gas into the container.

3. A method according to claim 1 including the step of measuring a pressure in the container while flowing the remainder of the pressurized gas into the container, and terminating the flowing step when the pressure in the container reached approximately the rated pressure.

4. A method according to claim 1 wherein the step of flowing comprises flowing the remainder of the mass in at least first and second flowing steps, and including the steps of measuring a pressure in the container after at least the first flowing step, with the last measured gas pressure in the container and the mass of pressurized gas flowed into the container during the first flowing step redetermining the remainder of the mass of pressurized gas still required to be flowed into the container to bring the pressure of the gas therein to approximately the rated pressure, and thereafter flowing the redetermined remainder of the mass of pressurized gas into the container to thereby bring its pressure to approximately the rated pressure.

5. A method according to claim 1 wherein the step of measuring comprises determining a pressure differential before and after the corresponding steps of adding, directing and flowing, respectively.

6. A method for rapidly filling a pressure container with a pressurized gas to about a rated pressure for the container comprising the steps of:

determining a prevailing pressure in the container;

adding an initial mass of the pressurized gas into the container;

measuring a pressure prevailing in the container after the adding step;

determining a remaining mass of the pressurized gas which must be added to the container to raise its internal pressure to about the rated pressure on the basis of only the initial mass and a pressure differential in the container before and after the adding step and without calculating a volume of the container;

thereafter adding the remaining mass of pressurized gas to the container in a plurality of flowing steps each comprising flowing a predetermined quantity of the mass of pressurized gas which is less than the remaining mass into the container;

after each flowing step measuring a pressure in the container;

with the last-mentioned measured pressure and the quantity of pressurized gas flowed to the pressure container during the preceding flowing step, determining a further mass of pressurized gas still to be added to the container to raise its pressure to about the rated pressure; and adjusting the quantity of the mass of pressurized gas flowed into the tank during subsequent flowing steps so that it corresponds to the further mass.

7. A method for rapidly filling a pressure container of an unknown volume with pressurized gas to about a rated pressure for the container, the method comprising the steps of:

(a) measuring an initial pressure prevailing in the container;

(b) supplying an initial mass of gas to the pressure container;

(c) measuring a pressure prevailing in the container following the supplying step;

(d) determining an initial pressure differential in the container before and after the supplying step;

(e) with the initial pressure differential and the initial mass of pressurized gas, determining a first additional mass of pressurized gas so that a plurality of the first additional masses must be added to the container to reach its rated pressure;

(f) adding the first additional mass of pressurized gas to the container;

(g) determining a second pressure differential in the container before and after the step of adding the first additional mass;

(h) with the second pressure differential and the previously added first additional mass, determining a second additional mass which, when added to the container, raises its pressure to about the rated pressure; and (i) thereafter directing the second additional mass into the container.

8. A method according to claim 7 wherein the step of directing includes flowing the adjusted second additional mass in at least two separate steps of flowing portions of the second additional mass.

9. A method according to claim 8 including the step of repeating steps (g) and (h) following a first one of the at least two separate flowing steps.

10. A method according to claim 7 including the steps of measuring an ambient temperature, and adjusting the rated pressure as a function of the ambient temperature to compensate the rated pressure for pressure changes in the container caused by changes in the ambient temperature.

11. A method according to claim 10 including adjusting the rated pressure of the container as a function of a temperature rise of the pressurized gas in the container resulting from compression heat caused by gas entering the container.

12. A method according to claim 11 including the steps of determining a filling time for filling the container with pressurized gas, and adjusting the rated pressure of the container as a function of a temperature reduction of the pressurized gas in the container as gas enters the container resulting from a temperature change in the container due to thermal dissipation.

13. A method according to claim 12 including the steps of measuring a temperature and a mass of pressurized gas supplied to the container; computing an average temperature for the supplied gas; and adjusting the rated pressure as a function of a difference between the ambient temperature and the computed average pressurized gas temperature.

14. A method according to claim 7 including the step of repeating the step of supplying an initial mass of the pressurized gas to the container if the initial pressure difference is less than a predetermined minimum difference.

15. A method according to claim 7 including the step of measuring the mass of pressurized gas introduced into the container during at least one of the steps of supplying, adding and directing by flowing the compressed gas through a flow meter employing the Coriolis principle.

16. A container tanking device for rapidly filling a pressure container having a rated maximum pressure with pressurized gas comprising:

a source of pressurized gas;

a delivery unit adapted to be placed in pressure-tight fluid communication with the source and the container for flowing pressurized gas from the source into the container;

a flow control and measurement device comprising a controllable regulating valve, a mass throughflow measuring device, and a pressure transducer operatively placed in a fluid flow between the source and the container, the pressure transducer being arranged between the regulating valve and the container;

a computer coupled with the pressure transducer and the mass throughflow measuring device and capable of calculating a mass of pressurized gas that is to be flowed into the container without calculating a volume of the container to bring its pressure to the rated pressure;

means operatively coupling the computer with the regulating valve for actuating the regulating valve so that the calculated mass is delivered to the container in a plurality of portions to thereby raise the pressure in the container to the rated pressure.

17. A device according to claim 16 including adjustment means for modulating the operation of the regulating valve so that the calculated mass is flowed into the container in a plurality of successive portions of the calculated mass, and means for adjusting each subsequent portion following a first portion to reflect changes in at least one of container gas pressure, a temperature of the pressurized gas in the container, and a temperature outside of the container so that a last one of the subsequent portions causes a pressure in the container which approximates the rated pressure.

18. A device according to claim 16 wherein the mass throughflow measuring device comprises a Coriolis-type mass flow meter.

* * * * *